Patented Feb. 27, 1945

2,370,280

UNITED STATES PATENT OFFICE 2,370,280

VINYL RESIN COMPOSITION

Victor Yngve, Lakewood, Ohio, assignor to Carbide and Carbon Chemicals Corporation, a corporation of New York No Drawing. Application October 18, 1941, Serial No. 415,649

4 Claims. (Cl. 260—23)

This invention relates to fillers for vinyl resins of the type produced by the conjoint polymerization of vinyl halides with vinyl esters of aliphatic acids. It is more particularly concerned with fillers for molding compositions containing conjoint polymers of vinyl chloride with vinyl acetate.

While many different types of fillers have previously been used in plastic compositions containing this resin, where they have served to modify the mechanical, electrical or chemical properties of the compositions, no filling material has previously been known which, when combined with the resins, will produce plastic compositions of increased toughness and impact strength, which retain the surface luster characterizing the unfilled resins. For instance, certain fibrous or cellulosic fillers will tend to increase the impact strength of molded articles of vinyl resins containing such fillers, but the molded objects thus produced do not have the attractive luster and appearance which distinguish objects made from unfilled molding compositions. According to this invention, it has been found that plastic compositions containing finely divided or colloidal aluminum hydrates intimately associated with the vinyl resins are characterized by the desired properties of increased impact strength and attractive surface luster.

While the invention is not to be limited by any theories as to the functions of the fillers in the novel plastic compositions, it has been noted that the aluminum hydrate fillers are intimately combined with the vinyl resins in a manner approaching a colloidal dispersion of the filler in the resin. For instance, upon microscopic examination of thin sections of the filled plastic compositions, no discrete particles of the filler are discernible, and the filled compositions have the same luster and appearance after fracture as do the unfilled resins. Despite the intimate dispersion of the filler achieved, plastic compositions containing the aluminum hydrate fillers are less vitreous in character than the unfilled compositions. This may result in a decreased rate of transmission of stress, as well as a more uniform distribution of the stress, when articles of the filled compositions are subjected to shock, which may account for the increased impact strength of the plastic compositions.

However, irrespective of the cause, the higher impact strength of plastic compositions containing the vinyl conjoint polymer resins associated with the aluminum hydrate fillers is noteworthy. For instance, the impact strength of a toothbrush handle molded from a composition containing a conjoint polymer of vinyl chloride and vinyl acetate and 20% aluminum hydrate by weight of the composition was 0.391 foot-pound per piece as determined by a modified Izod pendulum machine, whereas handles made from a similar composition without the aluminum hydrate had an impact strength of 0.246.

Other tests have also shown that the impact strength of sheets made from the filled compositions is decidedly greater than that of sheets made from vinyl resin compositions to which no aluminum hydrate had been added.

The tests were conducted by means of a modified Izod pendulum machine. The test pieces consisted of strips, 0.5 of an inch wide, 0.020 of an inch thick, which were fastened in the testing machine with the strips in a vertical position, projecting 0.5 of an inch above the clamp. The faces of the strips were disposed at a 45 degree angle to the striking head of the machine so that the impact was delivered at the edge of the test pieces. The critical peripheral velocity of the pendulum head to just shatter the test specimens was determined. The results of the tests were as follows:

| Mix No. | Resin | Aluminum hydrate | Stabilizers | Plasticizer | Pendulum velocity |
|---|---|---|---|---|---|
| | Parts | Parts | Parts | Parts | Ft. per sec. |
| 1 | 96 | 0 | 2.5 | 1.5 | 12 |
| 2 | 91 | 5 | 2.5 | 1.5 | 13.2 |
| 3 | 86 | 10 | 2.5 | 1.5 | 15.4 |
| 4 | 81 | 15 | 2.5 | 1.5 | 17.6 |
| 5 | 76 | 20 | 2.5 | 1.5 | 19.8 |

In the above compositions the resin was a conjoint polymer of vinyl chloride with vinyl acetate having an average molecular weight of about 10,000 to 14,000 and a combined vinyl chloride content of 85% to 95%; the stabilizers were composed of 1.5 parts of lead stearate, 0.5 part of the basic carbonate of white lead, and 0.5 part of phenyl salicylate; and the plasticizer was dibutyl sebacate.

The aluminum hydrate fillers employed in this invention may be selected from any of the grades available, but a preferred type is one in which the particles of the filler are coated with a small amount of a higher fatty acid substance. Exemplary of such materials are fatty oils, such as cocoanut oil, lard oil, and castor oil, as well as the fatty acids themselves, such as lauric, palmitic, stearic and oleic acids. Coated fillers of this type appear to disperse better in the vinyl resin compositions.

In most instances, the amount of filler to be employed will depend on the use for which the composition is intended. Molding compositions for phonograph records may contain from about 10% to 30% by weight of the filler, whereas injection molding compositions may contain from about 10% to 40% by weight of aluminum hydrate. If considerable amounts of plasticizers are also included, higher amounts of the filler may be employed. For instance, a plastic composition comprising 15 parts of a conjoint polymer of vinyl chloride with vinyl acetate containing about 95% vinyl chloride and having an average molecular weight of about 18,000, 50 parts of aluminum hydrate and 18 parts of a plasticizer was found to be tough, elastic and resilient.

Other compositions illustrating this invention will be given in the examples to follow:

*Example 1.*—A composition of the following ingredients was prepared:

| | Parts |
|---|---|
| Conjoint polymer of vinyl chloride with vinyl acetate, average molecular weight about 10,000, vinyl chloride content about 86% | 90.0 |
| Lead stearate | 2.0 |
| Triethylene glycol di(2-ethyl butyrate) | 3.0 |
| Xylyl heptadecyl ketone | 2.0 |
| Light lubricating oil | 2.0 |
| Blue dye | 2.0 |
| Aluminum hydrate containing 2% cocoanut oil | 30.0 |

Combs were readily formed from this composition by injection molding, showing that the presence of the filler does not affect the plastic properties of the resin. It was noted that these articles had a uniform lustrous surface, whereas previously, injection molding compositions containing fillers yielded objects having a dull and less attractive surface. In addition, the combs produced from the compositions containing the aluminum hydrate were tougher and more resistant to breaking than combs produced from compositions containing no fillers, and the teeth of the combs made from the filled compositions could be bent through a wider angle without breaking.

*Example 2.*—The following composition is suitable as a base for phonograph records:

| | Parts |
|---|---|
| Conjoint polymer of vinyl chloride with vinyl acetate, average molecular weight about 9000, average vinyl chloride content about 85% | 95.0 |
| Lead stearate | 1.5 |
| Ceresin wax | 2.0 |
| Carbon black | 1.5 |
| Diatomaceous earth | 10.0 |
| Aluminum hydrate containing 2% cocoanut oil | 10.0 |

Phonograph records were accurately molded from this composition, and such records had good wearing qualities and displayed very low surface noise level.

Modifications of the invention other than as specifically described above will be apparent to those skilled in the art. For instance, conjoint polymers of other vinyl halides, such as vinyl bromide, with other vinyl esters of aliphatic acids, for example, vinyl propionate and vinyl butyrate, may be employed, and small amounts of other polymerizable compounds may be included in the formation of the resins. The average molecular weight of the resins, as determined by Staudinger's method, may vary within the range of approximately 7000 to 22,000, or higher, depending on the amount of plasticizer present, and the vinyl halide content of the resins may vary from 70% to 95%. Furthermore, other plasticizers, waxes, lubricants, heat and light stabilizing agents, pigments, dyes and fillers may be included in the compositions without departing from the scope of the invention.

I claim:

1. A plastic composition comprising an intimate solid dispersion of an aluminum hydrate with a conjoint polymer of vinyl chloride with vinyl acetate having a combined vinyl chloride content of from 70% to 95%, the amount of said aluminum hydrate being at least 10% by weight of said composition and said plastic composition being characterized by its ability to be molded into objects of higher impact strength than unfilled compositions containing said conjoint polymer.

2. An impact-resistant sheet comprising an intimate solid dispersion of an aluminum hydrate with a conjoint polymer of vinyl chloride with vinyl acetate having a combined vinyl chloride content of from 70% to 95%, the amount of said aluminum hydrate being at least 15% by weight of said dispersion.

3. An injection molding composition characterized by its ability to be molded into impact-resistant objects having a lustrous surface, comprising an intimate solid dispersion of about 30 parts by weight of aluminum hydrate with about 90 parts by weight of a conjoint polymer of vinyl chloride with vinyl acetate having a combined vinyl chloride content of from 70% to 95%, and an average molecular weight in excess of 7000.

4. A plastic composition comprising an intimate solid dispersion of an aluminum hydrate containing a small amount of cocoanut oil with a conjoint polymer of vinyl chloride with vinyl acetate having a combined vinyl chloride content of from 70% to 95%, the amount of said aluminum hydrate being at least 10% by weight of said composition and said plastic composition being characterized by its ability to be molded into objects of higher impact strength than unfilled compositions containing said conjoint polymer.

VICTOR YNGVE.